United States Patent
Yamazaki et al.

(10) Patent No.: US 7,518,818 B2
(45) Date of Patent: Apr. 14, 2009

(54) MAGNETIC DISK DRIVE WITH FLYING HEIGHT CONTROL SYSTEM

(75) Inventors: Takanori Yamazaki, Kanagawa-ken (JP); Hideaki Tanaka, Kanagawa-ken (JP); Masayuki Kurita, Ibaraki (JP)

(73) Assignee: Hitachi Global Storage Technologies Netherlands B.V., AZ Amsterdam (NL)

(*) Notice: Subject to any disclaimer, the term of this patent is extended or adjusted under 35 U.S.C. 154(b) by 0 days.

(21) Appl. No.: 11/282,221

(22) Filed: Nov. 18, 2005

(65) Prior Publication Data
US 2006/0119974 A1  Jun. 8, 2006

(30) Foreign Application Priority Data
Dec. 7, 2004  (JP) ............... 2004-354000

(51) Int. Cl.
G11B 21/02  (2006.01)
G11B 19/02  (2006.01)
(52) U.S. Cl. .............................. 360/75; 360/69
(58) Field of Classification Search .......... None
See application file for complete search history.

(56) References Cited

U.S. PATENT DOCUMENTS

| | | | |
|---|---|---|---|
| 6,011,666 A | | 1/2000 | Wakamatsu |
| 6,124,998 A | * | 9/2000 | Kanegae ............... 360/68 |
| 6,359,746 B1 | | 3/2002 | Kakekado et al. |
| 6,608,728 B1 | * | 8/2003 | Sugiyama ............. 360/66 |
| 7,092,193 B1 | * | 8/2006 | McKenzie et al. .... 360/75 |
| 2003/0099054 A1 | | 5/2003 | Kamijima |
| 2005/0105204 A1 | * | 5/2005 | Bloodworth et al. .. 360/75 |
| 2005/0213243 A1 | * | 9/2005 | Huang et al. ......... 360/75 |

FOREIGN PATENT DOCUMENTS

| | | |
|---|---|---|
| JP | 62-250570 A | 10/1987 |
| JP | 05-020635 | 1/1993 |
| JP | 09-44979 | 2/1997 |
| JP | 2003-168274 | 6/2003 |

* cited by examiner

*Primary Examiner*—Andrew L Sniezek
(74) *Attorney, Agent, or Firm*—Townsend and Townsend and Crew LLP; John Henkhaus

(57) ABSTRACT

Embodiments of the invention appropriately control the flying height of a magnetic head slider as necessary without making the magnetic head slider touch the magnetic disk. In one embodiment, when a magnetic disk drive is started, the level of electric power predefined for the ordinary temperature (room temperature) is read in from the internal memory of an MPU. A temperature sensor measures the internal temperature of the magnetic disk drive and sends it to the MPU. According to the temperature sent from the temperature sensor, the MPU calculates the level of electric power which should be applied to a flying height adjustment structure. According to the calculated electric power, the MPU increases or decreases the electric power applied to the flying height adjustment structure. At a flying height controlled (corrected) by the flying height adjustment structure, a magnetic head slider performs read/write on a magnetic disk.

10 Claims, 5 Drawing Sheets

MAGNETIC DISK DRIVE WITH FLYING HEIGHT CONTROL SYSTEM

CROSS-REFERENCES TO RELATED APPLICATIONS

This application claims priority from Japanese Patent Application No. JP2004-354000, filed Dec. 7, 2004, the entire disclosure of which is incorporated herein by reference.

BACKGROUND OF THE INVENTION

The present invention relates to magnetic disk drives and more particularly to a method for controlling the flying height of a magnetic head slider.

To raise recording densities in magnetic disk drives and consequently realize higher storage capacity and more compact drives, efforts have been made to reduce the flying height as a major means. The flying height is defined as the distance between the magnetic head slider and the magnetic disk. Reducing the distance between the read/write element and the magnetic disk's recording surface makes it possible to raise the linear recording density in the direction of rotation of the magnetic disk.

There have been prior techniques to reliably reduce the flying height of a magnetic head slider in order to raise the linear recording density in the magnetic disk's direction of rotation. One example is a system proposed in Patent Document 1 (Japanese Patent Laid-Open No. 62-250570) where a flying height adjustment structure comprising piezoelectric blocks, etc., is built into a magnetic head slider. The distance between the read/write element and the disk is finely adjusted on an individual read/write element basis by moving the read/write element perpendicularly with respect to the magnetic disk surface. In the case of a magnetic head slider proposed in Patent Document 2 (Japanese Patent Laid-Open No. 5-20635), a heat source, instead of a piezoelectric block, is provided near the read/write element of each magnetic head slider. In this magnetic head slider, the flying height is adjusted through thermal expansion by applying heat to the vicinity of the read/write element.

In a magnetic disk drive employing a magnetic head provided with such a flying height adjustment structure as mentioned above, the flying height must be reduced without deteriorating the reliability of the magnetic disk drive. The magnetic head slider must be controlled to a desired height. A method for adjusting the flying height without deteriorating the magnetic disk drive is proposed in the aforementioned Patent Document 1. In this method, the output signal from a piezoelectric block of the flying height adjustment structure provided in the magnetic head slider is monitored in order to detect contact between the magnetic head slider and the magnetic disk.

In the case of a prior art technique disclosed in Patent Document 3 (Japanese Patent Laid-Open No. 2003-168274), heating means, provided on the opposite side of the magnetic head element when viewed from the air bearing surface, is energized to reduce the magnetic spacing only when the magnetic head element is operated.

BRIEF SUMMARY OF THE INVENTION

If the flying height of the magnetic head slider is excessively reduced, the magnetic head slider contacts the magnetic disk and vibrates due to frictional force. If the magnetic head slider vibrates, it is difficult to perform stable read/write operation. In addition, the slider's protective film and the disk's protective film are worn by the frictional force. If these protective films are worn away, the magnetic films of the magnetic head and disk may suffer corrosion, electric discharge, etc., posing a significant problem in the reliability of the magnetic disk drive. To secure the reliability of the magnetic disk drive, it is therefore critically important to minimize the frequency of contact between the magnetic head slider and the magnetic disk.

For example, if the temperature of the magnetic disk drive changes, the temperature changes as well in the vicinity of the read/write element provided in the magnetic disk drive. This causes a change in the flying height of the magnetic slider since the vicinity of the read/write element is deformed due to differences in the thermal expansion coefficient (a phenomenon called thermal protrusion). The temperature in the vicinity of the read/write element is always subject to change depending on the operating conditions such as time, season, place and environmental temperature and the heat generated by the spindle motor and control circuit board in the magnetic disk drive. For example, if the temperature of the magnetic disk drive rises, the vicinity of the read/write element protrudes making higher the possibility of the magnetic head slider getting in contact with the magnetic disk. If the temperature falls, the vicinity of the read/write element retreats away from the recording surface of the magnetic disk, which may make it impossible to perform stable read/write operation.

It is therefore not satisfactory to energize the heating means to reduce the flying height of the magnetic head slider only when the magnetic head element is operated. At any environmental temperature, a proper magnetic spacing must be formed by setting the flying height so as to bring the magnetic head element as close to the magnetic disk as possible without causing the magnetic head slider to contact the magnetic disk. To attain this flying height, the actuation of the flying height adjustment structure requires calibration. Usually, to calibrate the actuation, the flying height is reduced by operating the flying height adjustment structure until the magnetic head slider comes in contact with the magnetic disk. Then, after contact is detected between the magnetic head slider and the magnetic disk, the flying height is increased by a predetermined amount. Taking into consideration the reliability of the magnetic disk drive, however, this method is not preferable since the magnetic head slider is made in contact with the magnetic disk. Even if contact between the magnetic head slider and the magnetic disk is detected based on the output signal from a piezoelectric block as done in the aforementioned prior art method, this calibration method does not make any difference in that it requires contact between them. If the environmental temperature changes frequently, this calibration method has undesirable effect on the reliability of the magnetic disk drive.

It is a first feature of the present invention to provide a control method capable of maintaining a constant distance between the read/write element and the magnetic disk's recording surface without making the magnetic head slider touch the magnetic disk.

It is a second feature of the present invention to provide a high reliability magnetic disk drive where the magnetic head slider does not touch the magnetic disk.

According to an aspect of the present invention, a magnetic head slider flying height control method for a magnetic disk drive comprising a magnetic disk; a magnetic head slider which flies low above the magnetic disk to write or read magnetic information thereon; and a flying height adjustment structure provided with a heat source placed near the read/write element of the magnetic head slider to control the flying height of the magnetic head slider, is characterized in that the method comprises the steps of: detecting the temperature of the magnetic disk drive; calculating the amount of deformation of the read/write element relative to the magnetic head slider at the detected temperature; calculating the level of electric power which compensates for the amount of deformation calculated; and applying the calculated level of electric power to the flying height adjustment structure.

In some embodiments, the amount of deformation may be the amount of protrusion or the amount of retreat. Preferably, provided that the ratio of the change in the amount of protrusion of the read/write element to the change in the detected temperature is i nm/° C. and the ratio of the change in the flying height to the change in the electric power applied to the flying height adjustment structure is I nm/mW, if the temperature rises to T° C. from start temperature t° C., the electric power applied to the flying height adjustment structure is decreased by i(T−t)/I.

Preferably, provided that the ratio of the change in the amount of retreat of the read/write element to the change in the detected temperature is i nm/° C. and the ratio of the change in the flying height to the change in the electric power applied to the flying height adjustment structure is I nm/mW, if the temperature rises to T° C. from start temperature t° C., the electric power applied to the flying height adjustment structure is increased by i(T−t)/I.

The temperature of the magnetic disk drive may be the internal temperature of the magnetic disk drive. The temperature of the magnetic disk drive may be the temperature near the read/write element.

Preferably, the electric power applied to the flying height adjustment structure is lowered when the magnetic head slider writes information on the magnetic disk than when the magnetic head slider reads information therefrom.

A magnetic disk drive according to another aspect of the present invention is characterized in that it comprises: a magnetic disk; a magnetic head slider which flies low above the magnetic disk to write or read magnetic information thereon; a flying height adjustment structure provided with a heat source placed near the read/write element of the magnetic head slider to control the flying height of the magnetic head slider; a temperature detecting sensor; and a control unit, wherein said control unit, based on the temperature detected by the temperature detecting sensor, calculates the amount of deformation of the read/write element relative to the magnetic head slider; calculates the level of electric power which compensates for the amount of deformation calculated; and applies the calculated level of electric power to the flying height adjustment structure.

In some embodiments, the amount of deformation may be the amount of protrusion or the amount of retreat. The temperature sensor may be provided on a control circuit board having the control unit mounted thereon. The temperature sensor may be provided in the magnetic disk drive. The temperature sensor may be provided on the magnetic head slider. The temperature sensor may be designed to detect the temperature of the read/write element from the change of the resistance of the read/write element.

According to the present invention, it is possible to provide a control method capable of keeping a constant distance between a read/write element and a magnetic disk without the necessity of making the magnetic head slider touch the magnetic disk. Thus, it is also possible to provide a high reliability and large storage capacity magnetic disk drive where the magnetic head slider does not touch the magnetic head.

DETAILED DESCRIPTION OF THE INVENTION

Figure 2:
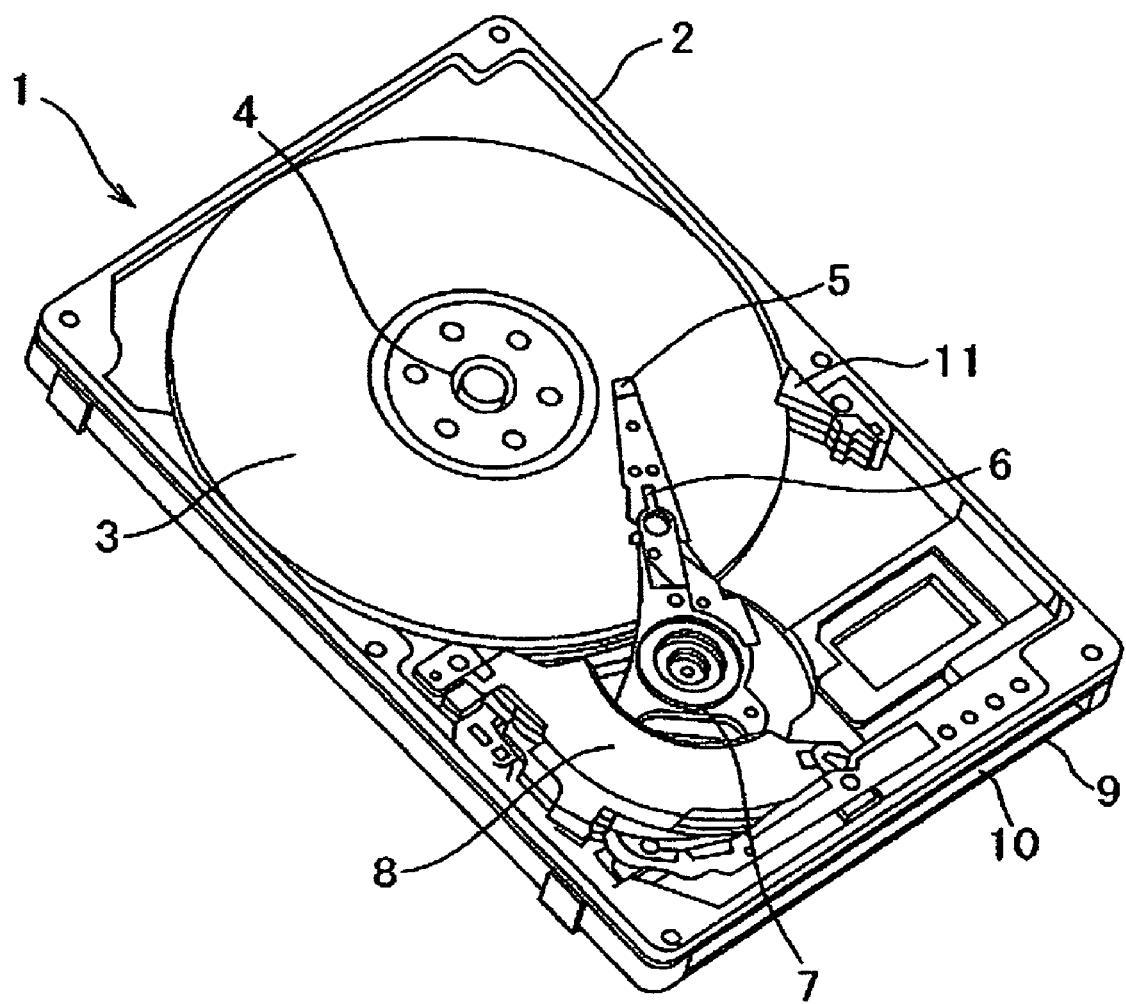
FIG. 2 schematically depicts the configuration of a magnetic disk drive in an embodiment of the present invention.
Figure 3:
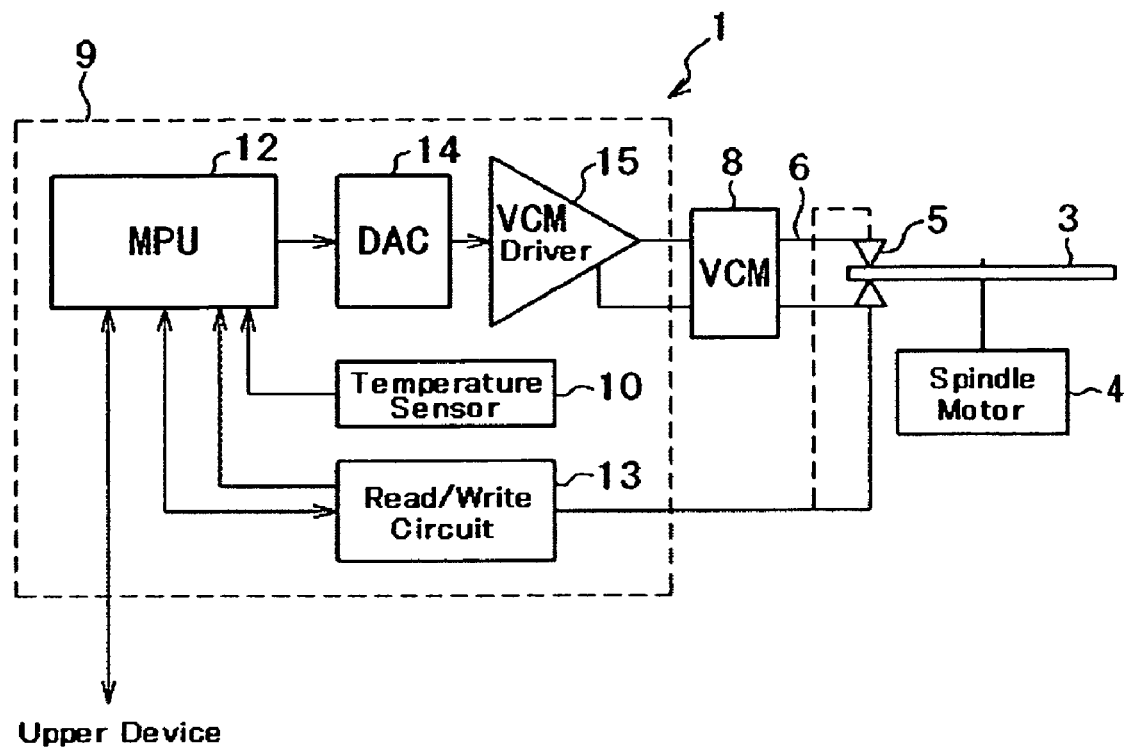
FIG. 3 is the block diagram of the magnetic disk drive embodiment of the present invention.

FIG. 2 schematically depicts the configuration of a magnetic disk drive according to an embodiment of the present invention. FIG. 3 is its block diagram including the control system. The magnetic disk drive 1 has a base 2 to form the enclosure, a cover (not shown in the figure) and a control circuit board 9 attached to the back side of the base 2. In FIG. 2, the cover is removed. Magnetic information is stored on a magnetic disk 3 which is rotated by a spindle motor 4 fixed on the base 2. Held and pressed toward the magnetic disk 3 by a suspension 6, a magnetic head slider 5 flies low above the magnetic disk 3 due to a flow of air generated by the rotating magnetic disk 3. When a seek operation is done to position the magnetic head slider 5 for read/write on the recording surface of the magnetic disk 3, the magnetic head slider 5 is moved in the radial direction of the magnetic disk 3 together with the suspension 6 by an actuator 7 which is driven by a voice coil motor (VCM) 8. The actuator 7 and the VCM 8 are mounted on the base 2 or the cover. If the magnetic disk drive 1 is stopped or if read/write is not done for a certain period of time, the magnetic head slider 5 is unloaded from the magnetic disk 3 onto a ramp 11 provided outside the disk.

The control circuit board 9 has: a control unit 12 composed of a micro processing unit (MPU); a read/write circuit 13 where data received from an upper device via the MPU 12 is converted to a write signal for supply to the magnetic head slider 5 and a signal retrieved by the magnetic head slider 5 is converted to data which is transferred to the upper device; a digital/analog converter (DAC) 14 where a position control signal for the magnetic head slider 5, generated by the MPU 12, is converted to a motor current control signal; a VCM driver 15 where the motor current control signal from the DAC 14 is converted to a drive current for the VCM 8; and a temperature sensor 10 which measures the temperature of the magnetic disk drive 1 and sends the temperature to the MPU 12.

Figure 4:
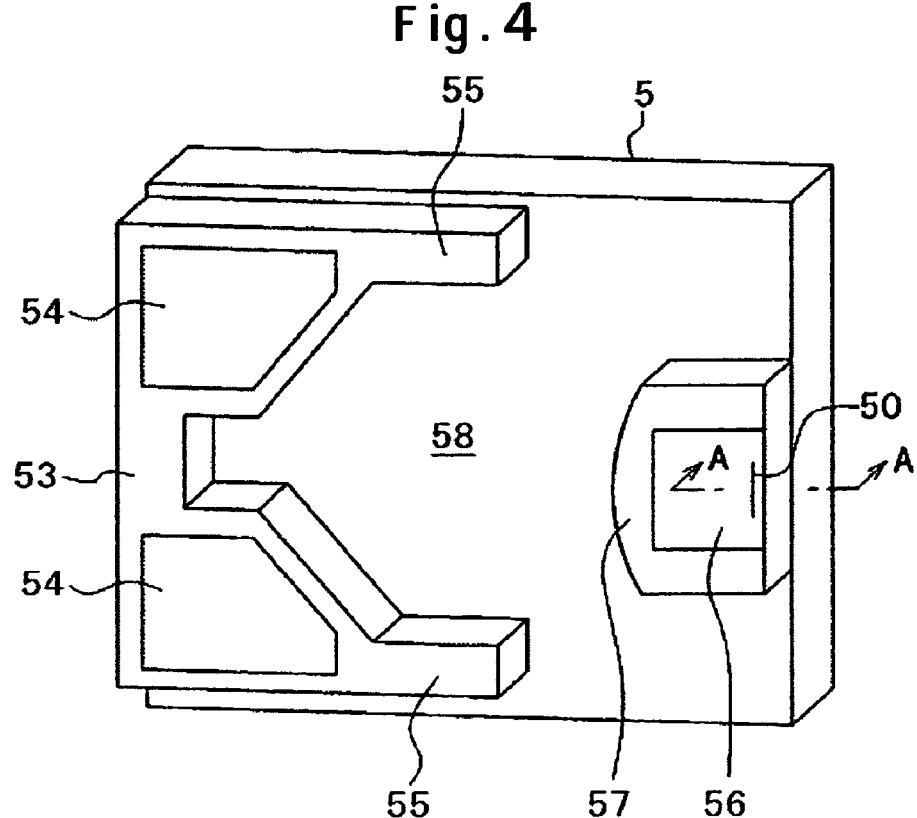
FIG. 4 shows the configuration of a magnetic head slider embodiment of the present invention viewed from the air bearing side.

FIG. 4 shows the external appearance of the magnetic head slider 5 viewed from the air bearing surface side. At the leading edge of the magnetic head slider 5, a leading edge shallow recess surface 53 and right and left leading edge air bearing surfaces 54 are formed. Lift force is produced by the leading edge shallow recess surface 53 and the leading edge air bearing surfaces 54. Behind the leading edge air bearing surfaces 54, side rails 55 are formed. In the middle of the trailing edge, a center air bearing surface 56 is formed and a center shallow recess surface 57 is formed around the center air bearing surface 56. In the middle of the magnetic head slider 5, a deep recess surface 58 is formed. Negative pressure is generated by the leading edge shallow recess surface 53 and the deep recess surface 58. The center air bearing surface 56 has a read/write element 50.

Figure 5:
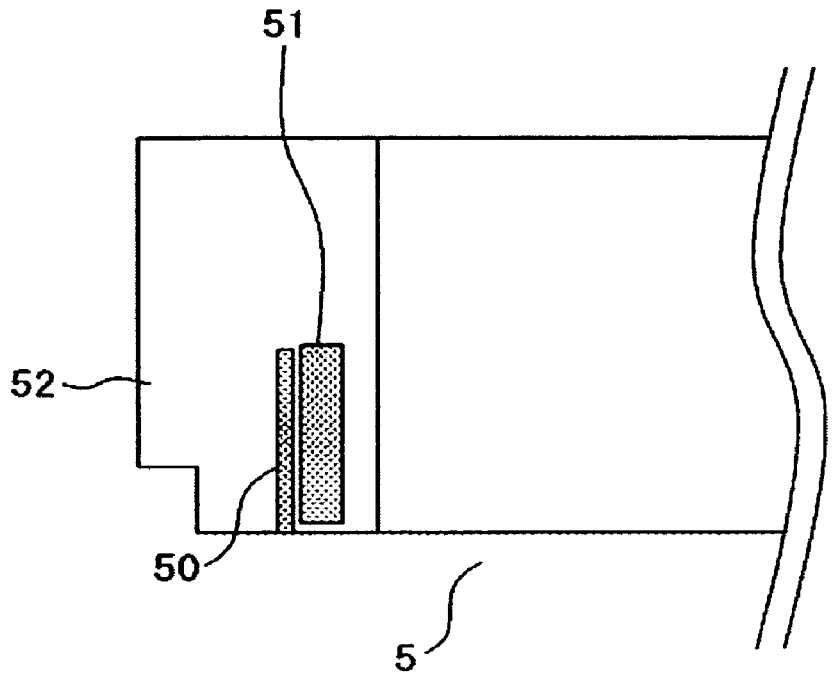
FIG. 5 is an enlarged sectional view along line A-A of FIG. 4.

FIG. 5 is an enlarged sectional view of the magnetic head slider 5 taken along line A-A of FIG. 4 where the read/write element 5 and its vicinity are shown. Near the read/write element 50, a flying height adjustment structure 51 is provided which adjusts the flying height of the magnetic head slider 5. The read/write element 50 and the flying height adjustment structure 51 are covered with an insulator 52. The flying height adjustment structure 51 is a heating structure comprising a heat source provided near the read/write element 50. The flying height adjustment structure 51 controls the flying height of the magnetic head slider 5 by controlling the temperature of the vicinity of the read/write element and thereby deforming the read/write element.

The following describes the thermal protrusion phenomenon which deforms the read/write element 50 on the magnetic head slider 5. Typically, the read/write element 50 is formed of such metal films as nickel- and cobalt-based alloys whereas the insulator 52 is formed of a ceramic such as alumina. Generally, metals have larger thermal expansion coefficients than insulating ceramics. Thus, if the temperature rises, since the read/write element 50 thermally expands more than the ceramic insulator 52, the read/write element 50 protrudes in the depth direction of the magnetic head slider 5, that is, toward the magnetic disk surface. Reversely, if the temperature falls, the read/write element 50 contracts away (retreats) from the magnetic disk surface. The heat source-based flying height adjustment structure 51 utilizes this thermal protrusion phenomenon. By controlling the temperature near the read/write element 50 through a heat source buried near the read/write element 50, the flying height adjustment structure 51 adjusts the flying height.

This embodiment of the present invention is characterized in that according to the temperature of the magnetic disk drive 1, the flying height adjustment structure 51 controls the flying height of the magnetic head slider 5 to an appropriate height. More specifically, the ambient temperature is measured by a temperature sensor 10 provided on the control circuit board 9 in the magnetic disk drive 1. In this flying height adjustment method, if the ambient temperature changes, the level of electric power applied to the heat source of the flying height adjustment structure 51 is appropriately changed according to the expected change of the temperature in the vicinity of the read/write element 50.

Figure 6:
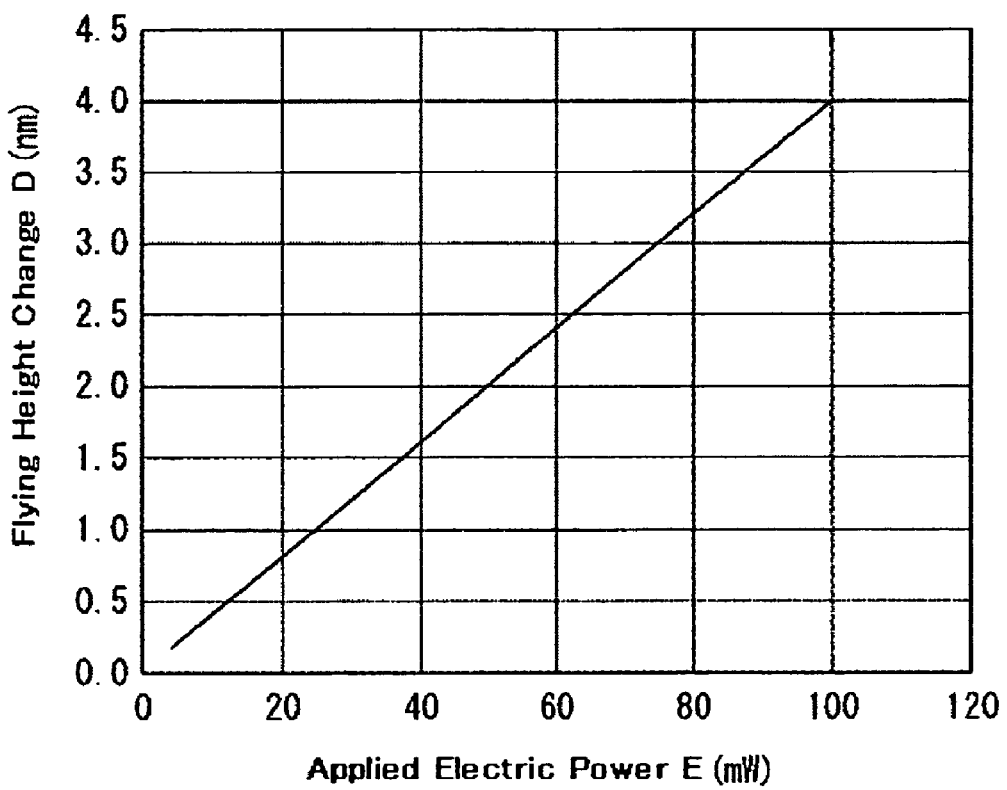
FIG. 6 shows the relation between the electric power applied to the flying height adjustment structure and the change of the flying height caused by the applied electric power.

Although the temperature in the vicinity of the read/write element 50 changes subject to the temperature in the magnetic disk drive 1, the flying height of the magnetic head slider 5 can properly be controlled without causing contact with the magnetic disk 3. This control method is described below. FIG. 6 shows an example of relation between E and D where E is the electric power applied to the flying height adjustment structure 51 and D is the flying height change caused by the flying height adjustment structure 51. In this figure, when the read/write element 50 comes closer to the magnetic disk 3, the change is considered positive. The flying height of the magnetic head slider 5 is lowered by D nm if electric power E mW is applied to the flying height adjustment structure 51. The ratio I of decrease of the flying height is about 0.04 nm/mW. The following relational expression holds: D=IE. The flying height adjustment structure 51 controls the flying height of the magnetic head slider 5 according to this relational expression so that the read/write element 50 is kept at a desired height, that is, the magnetic head slider 5 does not make contact with the magnetic disk 3 but the read/write element 50 is as close to the recording surface of the magnetic disk 3 as possible.

Figure 7:
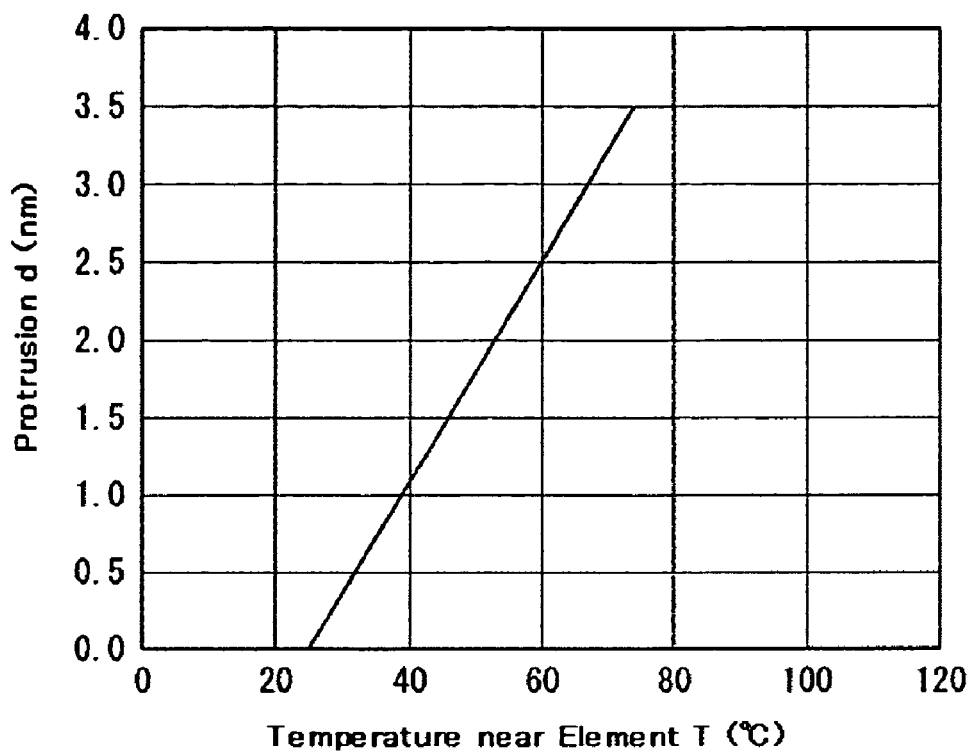
FIG. 7 shows the relation between the temperature near the read/write element and the protrusion of the read/write element.

FIG. 7 shows an example of relation between T and d where T is the temperature near the read/write element 50 and d is the amount of thermal protrusion of the read/write element 50. As shown in this figure, the amount of thermal protrusion is designed as zero at room temperature t which is assumed to be 25° C. In addition, when the read/write element 50 comes closer to the magnetic disk 3, the protrusion is considered positive. If the temperature T near the read/write element 50 rises along with a temperature rise in the magnetic disk drive 1, the read/write element 50 protrudes toward the magnetic disk 3 by d nm. The protruding rate i is about 0.07 nm/° C. The following relational expression holds: d=i(T−t).

The change of the flying height of the magnetic head slider 5 in the magnetic disk drive is obtained by adding the protrusion D, caused by the flying height adjustment structure 51 as shown in FIG. 6, to the thermal protrusion d caused by a change of temperature caused by the flying height adjustment structure 51 as shown in FIG. 7. That is, the actual change in the flying height is D+d nm. When the magnetic disk drive 1 is operating at assumed room temperature t, the thermal protrusion d is 0 nm as designed. In this case, the magnetic head slider 5 can be kept at a desired height, allowing stable read/write operation. However, if the temperature of the magnetic disk drive 1 changes, the flying height of the magnetic head slider 5 changes by d nm. Specifically, if the temperature of the magnetic disk drive 1 becomes higher than t, the distance between the magnetic head slider 5 and the magnetic disk becomes d nm smaller than the desired distance. If the temperature of the magnetic disk drive 1 becomes lower than t, the distance between the magnetic head slider 5 and the magnetic disk becomes d nm larger than the desired distance.

To keep the magnetic head slider 5 at the desired height, it is necessary to compensate for the thermal protrusion caused by the change of temperature T of the disk drive 1. This compensation can be realized by changing the electric power applied to the flying height adjustment structure 51 from E to e: e=E−i(T−t)/I. This results in D+d=Ie+i(T−t)=I{E−i(T−t)/I}+i(T−t)=IE.

Specifically, if the temperature of the magnetic disk drive 1 is higher than the room temperature, namely, if the temperature of the magnetic disk drive 1 measured by the temperature sensor 10 is higher than the room temperature, the temperature in the vicinity of the read/write element 50 shows a rise as well. Since this temperature rise raises the temperature of the read/write element 50, the read/write element 50 protrudes at a rate shown in FIG. 7, generating a possibility of the magnetic head slider 5 touching the magnetic disk 3. In this case, the level of electric power applied to the flying height adjustment structure 51 is set lower than the level set at the ordinary temperature. For example, when the magnetic disk drive 1 is turned on, the magnetic disk drive 1, including the vicinity of the read/write element 50, is at room temperature t (25° C.). If the temperature of the magnetic disk device 1 rises to 60° C. after long operation, the temperature in the vicinity of the read/write element 50 rises as well. As a result of this temperature rise, the protrusion of the read/write element 50 becomes about 2.45 nm larger than that at room temperature.

Figure 8:
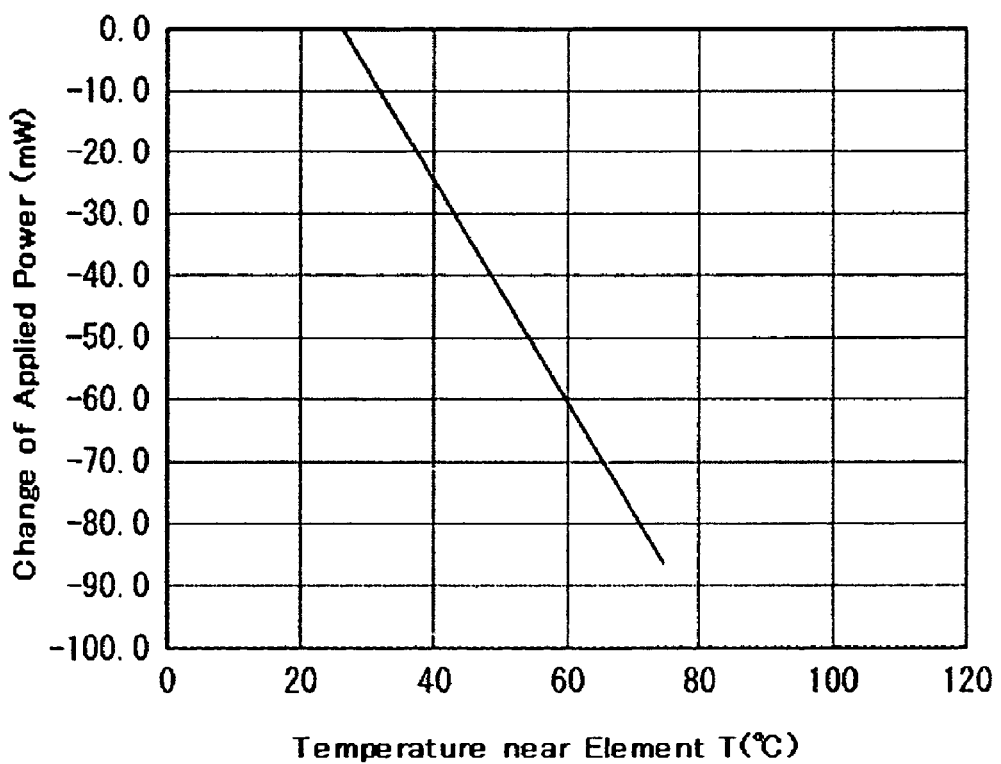
FIG. 8 shows the relation between the temperature near the read/write element and the corresponding change of the applied electric power.

FIG. 8 shows the relation between the temperature T of the read/write element 50 and the adjustment electric power applied to the flying height adjustment structure 51. If the read/write element protrudes about 2.45 nm as mentioned above, the electric power applied to the flying height adjustment structure 51 is set about 61.3 mW lower than that at room temperature as shown in FIG. 8. Thus, since the flying height adjustment structure 51 appropriately compensates the flying height of the magnetic head slider 5 for the protrusion increased due to the temperature change in the magnetic disk drive 1, the magnetic head slider 5 does not make contact with the magnetic disk 3.

Reversely, if the temperature of the magnetic disk drive 1 is lower than the room temperature, namely, if the temperature of the magnetic disk drive 1 measured by the temperature sensor 10 is lower than the room temperature, the temperature in the vicinity of the read/write element 50 shows a fall as well. This temperature fall causes the read/write element 50 to retreat. In this case, the level of electric power applied to the flying height adjustment structure 51 is set higher than the level set at the ordinary temperature. Thus, stable read/write operation is possible since the read/write element 50 can be kept close to the magnetic disk 3 even if the temperature of the magnetic disk drive 1 falls.

Figure 1:
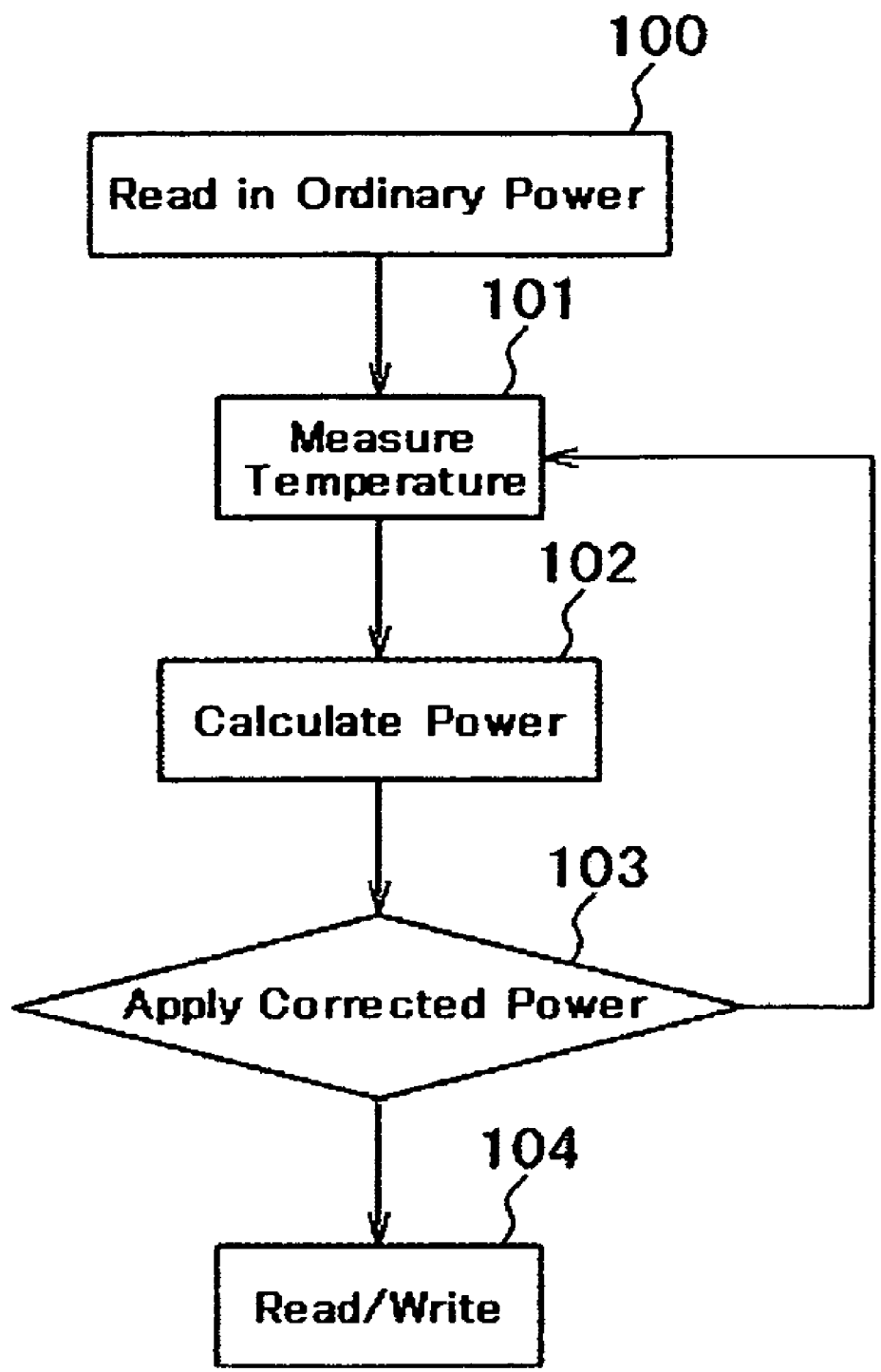
FIG. 1 is a flowchart of a procedure followed in order to control the flying height of a magnetic head slider in an implementation of the present invention.

FIG. 1 shows a flowchart of the control procedure described above. When the magnetic disk drive 1 is started, the level of electric power predefined for the ordinary temperature (room temperature) is read in from the internal memory of the MPU 12 (step 100). The temperature sensor 10 measures the internal temperature of the magnetic disk drive and sends it to the MPU 12 (step 101). According to the temperature sent from the temperature sensor 10, the MPU 12 calculates the level of electric power which should be applied to the flying height adjustment structure 51 (step 102). According to the calculated electric power, the MPU 12 increases or decreases the electric power applied to the flying height adjustment structure 51 (step 103). At a flying height controlled (corrected) by the flying height adjustment structure, the magnetic head slider 5 performs read/write on the magnetic disk 3 (step 104). Each time a temperature change occurs, steps 101, 102 and 103 are repeated.

Thus, stable read/write operation is possible even if the temperature of the read/write element 50 changes. That is, even if the temperature rises, the magnetic head slider 5 does not touch the magnetic disk 3. Even if the temperature falls, the read/write element 50 can be kept close to the magnetic disk 3.

Note that although the temperature sensor 10 mounted on the control circuit board 9 is used to detect the temperature near the read/write element 50 in the embodiment described above, it is also possible to mount the temperature sensor 10 in another place. For example, the temperature sensor may be attached to the magnetic head slider 5 itself or some other appropriate place on the base 2. It is also possible to detect the temperature of the read/write element 50 itself by monitoring the change of the internal resistance of the read/write element 50.

In the description of the embodiment above, it is assumed that the change of the temperature near the read/write element 50, which causes deformation (protrusion/retreat) of the read/write element 50, is exclusively attributable to the change of the environmental temperature. Actually, however, other factors may change the temperature of the read/write element, too. For example, when magnetic information is recorded, the coil of the read/write element 50 is heated due to the applied current, which makes the read/write element 50 protrude. Even in this case, it is possible to keep the magnetic head slider 5 at the same desired height by reducing the electric power applied to the flying height adjustment structure 51. The ratio of the change in the protrusion of the read/write element 50 to the change in the applied current can be calculated from the impedance of the read/write element's coil, the frequency of the applied current and the magnitude of the applied current.

Further, although it is assumed in the description of the embodiment that I is about 0.04 nm/mW, t is room temperature (25° C.) and i is about 0.07 nm/° C., it is needless to say that the present invention is also effective where they are designed to have different values. In addition, although it is assumed in the description of the embodiment that the flying height control amount D is a linear function of the electric power E and the protrusion d of the read/write element is also a linear function of the temperature near the read/write element, it is needless to say that a similar result can be obtained if these relations can be approximated by linear functions.

As described so far, in a magnetic disk drive provided with a heat source-used flying height adjustment structure, even when the temperature of the magnetic disk drive changes, it is possible to appropriately adjust the flying height by the flying height adjustment structure without the necessity of making the magnetic head slider touch the magnetic disk. Thus, it is possible to realize a high reliability and large storage capacity magnetic disk drive.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider flying height control method for a magnetic disk drive comprising a magnetic disk; a magnetic head slider which flies low above the magnetic disk to write or read magnetic information thereon; and a flying height adjustment structure provided with a heat source placed near the read/write element of the magnetic head slider to control the flying height of the magnetic head slider, said method comprising:

detecting the temperature of the magnetic disk drive;
    calculating the amount of deformation of the read/write element relative to the magnetic head slider at the detected temperature;
    calculating the level of electric power which compensates for the amount of deformation calculated; and
    applying the calculated level of electric power to the flying height adjustment structure;
    wherein the amount of deformation is the amount of protrusion or the amount of retreat, and
    wherein provided that the ratio of the change in the amount of protrusion of the read/write element to the change in the detected temperature is i nm/° C. and the ratio of the change in the flying height to the change in the electric power applied to the flying height adjustment structure is I nm/mW, if the temperature rises to T° from start temperature t° C., the electric power applied to the flying height adjustment structure is decreased by $i(T-t)/I$.

2. A magnetic head slider flying height control method according to claim 1, wherein the temperature of the magnetic disk drive is the internal temperature of the magnetic disk drive.

3. A magnetic head slider flying height control method according to claim 1, wherein the temperature of the magnetic disk drive is the temperature near the read/write element.

4. A magnetic head slider flying height control method for a magnetic disk drive comprising a magnetic disk; a magnetic head slider which flies low above the magnetic disk to write or read magnetic information thereon; and a flying height adjustment structure provided with a heat source placed near the read/write element of the magnetic head slider to control the flying height of the magnetic head slider, said method comprising:

detecting the temperature of the magnetic disk drive;
  calculating the amount of deformation of the read/write element relative to the magnetic head slider at the detected temperature;
  calculating the level of electric power which compensates for the amount of deformation calculated; and
  applying the calculated level of electric power to the flying height adjustment structure;
  wherein the amount of deformation is the amount of protrusion or the amount of retreat, and
  wherein provided that the ratio of the change in the amount of retreat of the read/write element to the change in the detected temperature is i nm/° C. and the ratio of the change in the flying height to the change in the electric power applied to the flying height adjustment structure is I nm/mW, if the temperature rises to T° C. from start temperature t° C., the electric power applied to the flying height adjustment structure is increased by i(T−t)/I.

5. A magnetic disk drive comprising:

a magnetic disk;
  a magnetic head slider which flies low above the magnetic disk to write or read magnetic information thereon;
  a flying height adjustment structure provided with a heat source placed near the read/write element of the magnetic head slider to control the flying height of the magnetic head slider;
  a temperature detecting sensor; and
  a control unit;
  wherein said control unit, based on the temperature detected by the temperature detecting sensor, calculates the amount of deformation of the read/write element relative to the magnetic head slider; calculates the level of electric power which compensates for the amount of deformation calculated; and applies the calculated level of electric power to the flying height adjustment structure; and
  wherein the amount of deformation is the amount of protrusion or the amount of retreat; and
  wherein the control unit is configured to decrease the electric power supplied to the flying height adjustment structure by i(T−t)/I, if the temperature rises to T< C. from start temperature t< C., provided that the ratio of the change in the amount of protrusion of the read/write element to the change in the detected temperature is i nm/° C. and the ratio of the change in the flying height to the change in the electric power applied to the flying height adjustment structure is I nm/mW.

6. A magnetic disk drive comprising:

a magnetic disk;
  a magnetic head slider which flies low above the magnetic disk to write or read magnetic information thereon;
  a flying height adjustment structure provided with a heat source placed near the read/write element of the magnetic head slider to control the flying height of the magnetic head slider;
  a temperature detecting sensor; and
  a control unit;
  wherein said control unit, based on the temperature detected by the temperature detecting sensor, calculates the amount of deformation of the read/write element relative to the magnetic head slider; calculates the level of electric power which compensates for the amount of deformation calculated; and applies the calculated level of electric power to the flying height adjustment structure; and
  wherein the amount of deformation is the amount of protrusion or the amount of retreat; and
  wherein the control unit is configured to increase the electric power supplied to the flying height adjustment structure by i(T−t)/I, if the temperature rises to T< C. from start temperature t° C., provided that the ratio of the change in the amount of retreat of the read/write element to the change in the detected temperature is i nm/° C. and the ratio of the change in the flying height to the change in the electric power applied to the flying height adjustment structure is I nm/mW.

7. A magnetic disk drive according to claim 6, wherein the temperature sensor is provided on a control circuit board having the control unit mounted thereon.

8. A magnetic disk drive according to claim 6, wherein the temperature sensor is provided in the magnetic disk drive.

9. A magnetic disk drive according to claim 6, wherein the temperature sensor is provided on the magnetic head slider.

10. A magnetic disk drive according to claim 6, wherein the temperature sensor detects the temperature of the read/write element from the change of the resistance of the read/write element.

* * * * *

UNITED STATES PATENT AND TRADEMARK OFFICE
CERTIFICATE OF CORRECTION

PATENT NO.         : 7,518,818 B2                                        Page 1 of 1
APPLICATION NO. : 11/282221
DATED              : April 14, 2009
INVENTOR(S)        : Yamazaki et al.

It is certified that error appears in the above-identified patent and that said Letters Patent is hereby corrected as shown below:

Claim 5, column 10, line 3, please delete "T<C." and insert -- T°C --

Claim 5, column 10, line 4, please delete "t<C." and insert -- t°C --

Claim 6, column 10, line 32, please delete "T<C." and insert -- T°C --

Claim 6, column 10, line 33, please delete "t°C." and insert -- t°C --

Signed and Sealed this

Sixteenth Day of June, 2009

JOHN DOLL
*Acting Director of the United States Patent and Trademark Office*